Aug. 25, 1936.   I. KOVACH   2,052,309
SHOCKPROOF UNDERCARRIAGE
Filed Oct. 18, 1934
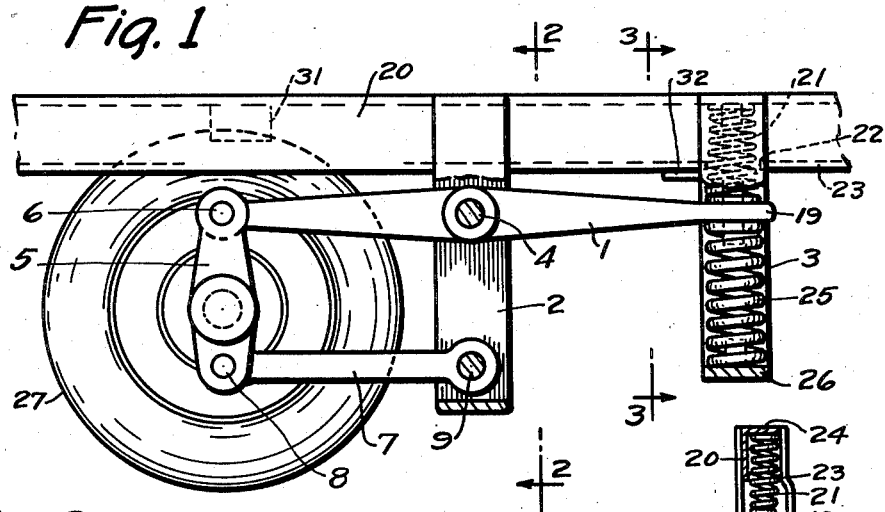
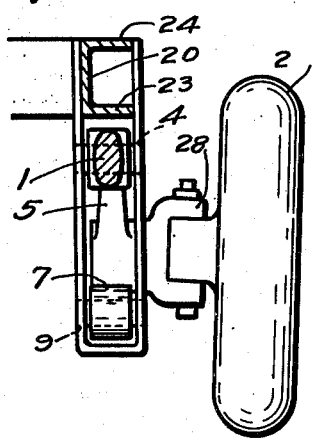
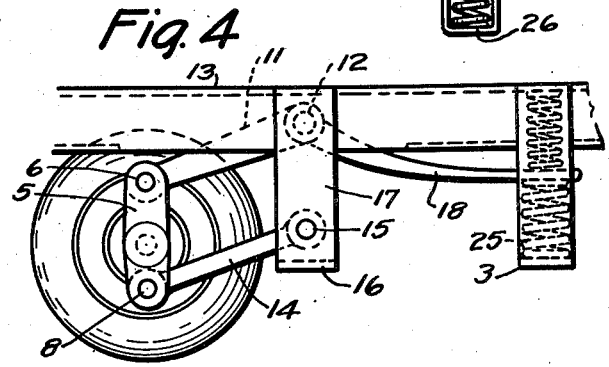
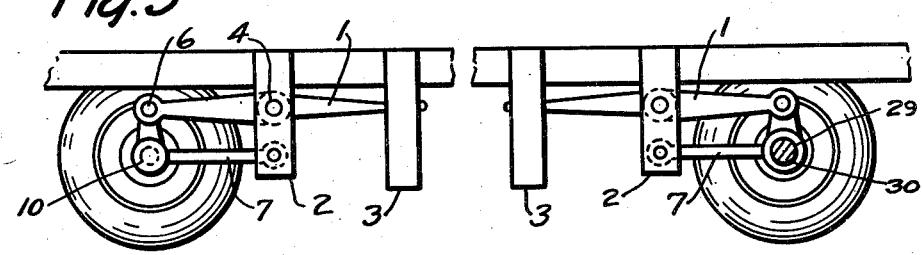
INVENTOR
*Imre Kovach*
BY
*James Harrison Bowen*
ATTORNEY Patented Aug. 25, 1936

2,052,309

UNITED STATES PATENT OFFICE 2,052,309

SHOCKPROOF UNDERCARRIAGE

Imre Kovach, Bronx, N. Y.

Application October 18, 1934, Serial No. 748,861

1 Claim. (Cl. 267—20)

The purpose of this invention is to provide an apparatus directly connected to the chassis of a motor vehicle, or which may also be used for other purposes, which will directly absorb the shock resulting from the wheels striking objects or dropping into pits, without transmitting this shock thru the chassis to the vehicle, and which will draw the chassis downward to compensate for the upward movement of the wheel when it strikes an object.

The invention is a pivotally mounted arm under the side members of the chassis of a motor vehicle, having a wheel mounted in one end of the arm with springs positioned on both sides of the opposite end and adapted to hold the arm in a neutral position, and the arm is provided with guiding means by which the wheels move upward and downward with a vertical movement.

Many attempts have been made to provide means for absorbing the shock of motor vehicles, and many devices, such as are commonly known as knee actions, have recently been devised for mounting front wheels of motor vehicles to permit the wheel to readily move upward and downward without moving the chassis, but all of these devices take only the sharp edge off of the shock, and none provide means for counteracting unevenness of the surface over which the vehicle is travelling by drawing the chassis downward when the wheel is knocked upward, in order to keep the chassis substantially on the same level, however, substantially all of these devices involve comparatively complicated construction and, owing to the many small parts, have proved substantially impossible to adjust or repair on the road. The complicated construction of these devices is also objectionable because of the additional movements necessary in order to operate the steering knuckle and brakes thru the movable joints.

The object of this invention is, therefore, to obtain the same free movement of the wheel with a comparatively simple arrangement of levers and springs.

Another object is to provide means for attaching a wheel, or the like, to a substantially fixed object, in which the wheel may readily move in relation to the object.

Another object is to provide means for mounting a wheel upon a substantially fixed object, in which the wheel may move upward to compensate for obstructions, and also move downward to compensate for certain drops in a roadway or surface over which the wheel is travelling.

Another object is to provide a comparatively simple construction for wheels attached to fixed objects which permits the wheel to move toward or away from the object in a vertical line.

A further object is to provide a flexible mounting for wheels and motor vehicles, in which the entire mounting may be contained in a space below one member of the chassis. And a still further object is to provide a flexible construction for mounting wheels on motor vehicles wherein the wheel absorbs the shock, which is of a rugged, sturdy construction, and which is also simple and economical.

With these ends in view the invention embodies an arm pivotally mounted in a bracket below one of the side members of the chassis with one end of the arm held between two springs and with the axle of the wheel mounted in a vertical member pivotally attached to the opposite end of the arm, the lower end of said vertical member pivotally attached to said bracket with a bar providing means whereby said vertical member may move vertically upward and downward. Substantially the same mounting may be used for both front and rear wheels.

Other features and advantages of the invention will appear from the following description, taken in connection with the drawing, wherein:

Figure 1 is a view showing the general arrangement of the device as attached to one of the side members of the chassis of a motor vehicle frame, and mounted in hangers suspended from the chassis.

Figure 2 is a cross section on line 2—2 of Figure 1, showing the bracket in which the device is mounted.

Figure 3 is a cross section on line 3—3 of Figure 1, showing the spring mounting bracket.

Figure 4 is a detail showing a view substantially the same as shown in Figure 1, showing an alternate arrangement in which the supporting points are raised to provide clearance.

Figure 5 is a view showing another alternate arrangement and also showing the device provided for both front and rear wheels of a motor vehicle.

It will be understood that the arrangement shown in the drawing is diagrammatic, and any means may be provided for supporting the device, and it may also be mounted in any position below the side members of the frame, or attached thereto in any manner. It will also be understood that the wheels may be suspended in front of, or behind, the supporting means, and the steering knuckles, brake drums, and differential shaft may be mounted in the device or attached thereto in any manner. All of these parts operate in the usual manner, except that the steering and brake connections are attached to universal or other flexible joints.

In the drawing the device is shown as it may be made wherein numeral 1 indicates the supporting arm, numeral 2 the hanger or supporting bracket, and numeral 3 the spring bracket.

The arm 1 may be made straight, as shown in Figure 1, or may be bent upward, as shown in Figure 4, in which the pivot is raised to a point within the side member of the frame or chassis, however, this arm may be of any shape or design, and may be mounted in any manner. In the design shown, this arm is pivotally mounted on a pin 4 in the bracket 2, and the wheel end is pivotally attached to a vertical member 5 with a pin 6. In the design shown in Figure 1, the lower end of the member 5 is pivotally attached to a bar 7 thru a pin 8, and the inner end of the bar 7 is pivotally mounted in the bracket 2 on a pin 9. It will be noted that the center of the pin 9 is positioned in a vertical line extending downward from the pin 4, so that it is directly below the center of the pivot point of the arm 1. This arrangement forms a parallelogram which causes the member 5 to remain in a vertical position as it moves upward and downward. It will be understood, however, that these levers may be arranged in any manner, and the lower end of the member 5 may be pivotally attached to the bracket 2 in any manner, or by any means. Instead of extending the lower end of the member 5 downward, as shown in Figure 1, the bar 7 may be attached to the member 5 at a point corresponding with the center of the axis of the wheel, as indicated by the numeral 10, and shown in Figure 5. It will be understood, however, that this bar may be attached to any point and located at any position. This bar may also be bent upward, as shown in Figure 4, and indicated by the numeral 11, so that it may be pivoted on a pin 12 in the side member 13 of the chassis, and with the forward end extending downward to the pin 6 on the vertical member 5, and the bar 7 may be replaced by the bar 14, one end of which may be mounted on the pin 8, and the other extended upward to a pin 15, so that the axis of this bar may be parallel to the forward end of the arm 11. With this arrangement, the lower end 16 of the supporting bracket which is indicated by the numeral 17, may be considerably higher than with the levers arranged as shown in Figure 1. The rear portion 18 of the arm 11 may curve downward to the point between the springs, as shown.

The rear portion of the arm 1, in the design shown in Figure 1, extends backward, and the end 19 thereof is positioned in the bracket 3, which hangs downward from the side member 20 of the chassis, and above the end 19 is a spring 21, which extends thru an opening 22 in the lower leg 23 of the member 20, and bears against the under surface of the upper leg 24. Below the end 19 is a comparatively heavy spring 25, which extends downward to the lower end 26 of the bracket 3, and it will be noted that as the wheel, which is indicated by the numeral 27, engages an obstruction, it will raise the forward end of the lever 1, and the rear end will be forced downward, compressing the spring 25, whereas, should the wheel drop into a hole, the end 19 will move upward, compressing the spring 21. It will be noted that when the wheel 27 is raised and the spring 25 compressed, the spring will bear against the lower end of the bracket 3, and thereby have a tendency to draw the frame or chassis downward to compensate for the action of the wheel, thereby counteracting the shock.

In the design shown in Figure 2, the wheel 27 is shown attached to the vertical member 5 thru a steering knuckle, however, it will be understood that the steering knuckle is only shown in outline, and this may be arranged in any manner, and it will also be understood that the brake drum may be incorporated in the wheel, or on the surface thereof, and suitable connections made thereto. The yoke of the steering knuckle is shown as being made integral with the member 5, however, it will also be understood that this may be made in any manner and may be attached thereto by any means. This shows a typical mounting for the front wheel, and it will be understood that the rear axle, which is indicated by the numeral 29, and as shown in Figure 5, may extend thru an opening 30 in the member 5, or may be attached thereto in any manner. It will also be understood that this device shows an independent mounting for wheels at each side, however, it will be understood that the axle, and particularly the rear axle, may extend straight thru, or may be connected thereto by any means.

It will be understood that other changes may be made in the construction without departing from the spirit of the invention. One of which changes may be in the use of other means for mounting the supporting bracket 2 on the motor vehicle, another may be in the use of other means for mounting the wheel in the supporting bracket, and still another may be in the use of springs of any other type or design, or in the use of other means for mounting the springs.

The construction will readily be understood from the foregoing description. In use the device may be provided as shown and described, and may be attached to the motor vehicle as shown, or mounted in any manner. This device is arranged to replace the knee action, particularly of the front wheels of a motor vehicle, and it will be noted that it may be made as strong or of as sturdy construction as may be desired. The strength in the springs may be determined by the weight of the vehicle, and these may be designed to hold the arm 1 in substantially a horizontal position, as shown. The upper spring 21 may be comparatively light, as compared with the spring 25, as the spring 25 takes the load of the vehicle. With the wheels mounted in this manner, the vehicle may travel over uneven surfaces with perfect ease, as substantially all of the shock will be absorbed in the wheels, which are free to move upward and downward without transmitting the shock load to the vehicle. This device is shown as attached to one of the side members of the chassis with the arm 1 directly below the side member and the lower leg of the side member may have a portion cut away to permit the forward end of the arm 1 to travel upward into the side member, and the lower leg may also be cut away at the rear to provide room for the upper spring, as hereinbefore described. Springs of any type may be used, and the frame, bracket, and arm 1 may be provided with locating means for holding the springs in the working position. The mechanical details may be worked out to accommodate vehicles of different designs.

This device may also be provided with means for limiting the upward movement of the wheels in order to facilitate changing tires, and it will be noted that a bumper 31 may be placed in the member 20 above the forward end of the arm 1, and another bumper 32 may be placed on the lower surface of the member 20, in front of the upper spring. It will be understood, however, that these bumpers may be located at any other point or points, or any other means may be provided for limiting the movement of the arm in order to facilitate changing tires.

Having thus fully described the invention, what I claim as new and desire to secure by Letters Patent, is:

A wheel mounting for motor vehicles of the type having a chassis with side members comprising a substantially vertical bracket upon which the wheel is rotatably mounted, a stationary bracket extending downward from the chassis of the vehicle, and positioned to one side of the bracket on which the wheel is mounted, a lever pivotally mounted in said stationary bracket and positioned below one of the side members of the chassis and extending a substantially equal length in both directions, means pivotally connecting one end of said lever to the vertical bracket on which the wheel is mounted, a second stationary bracket positioned a substantial distance from the former stationary bracket and at a point located from the former stationary bracket a distance substantially equal to the distance the center of the wheel is located from said former stationary bracket, a spring between the lower side of the end of said arm and the lower end of the second stationary bracket resiliently holding said arm upward, another spring between the upper side of said arm and the upper end of said stationary bracket resiliently holding said arm downward; and a bar pivotally mounted in the lower end of the former stationary bracket and at a point vertically below the point where said lever is pivotally mounted, and means pivotally connecting the opposite end of said rod to the lower end of the bracket in which the wheel is mounted.

IMRE KOVACH.